Nov. 29, 1932.    M. FIELDMAN    1,889,354
SHOCK ABSORBER
Original Filed June 23, 1927    3 Sheets-Sheet 3
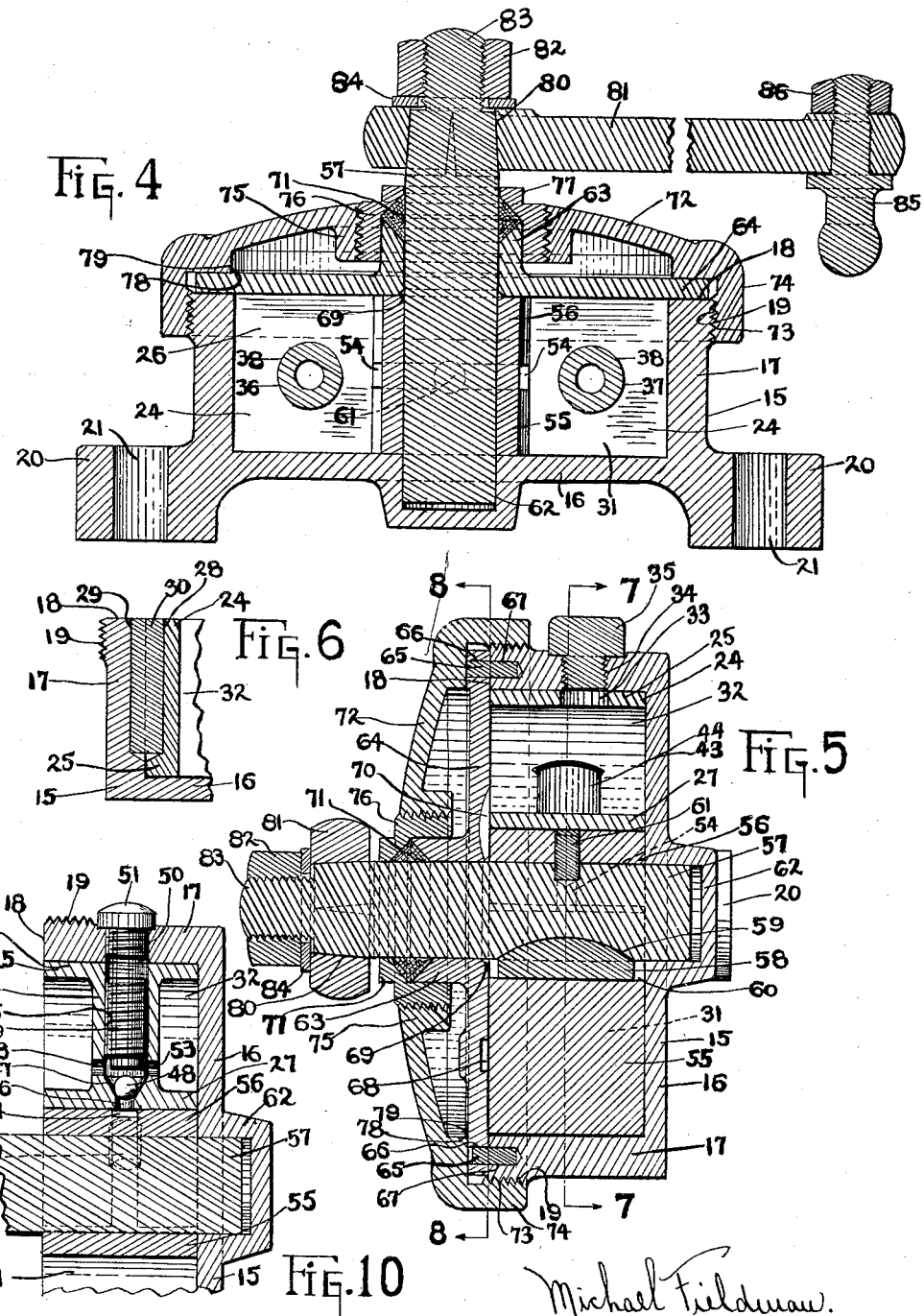

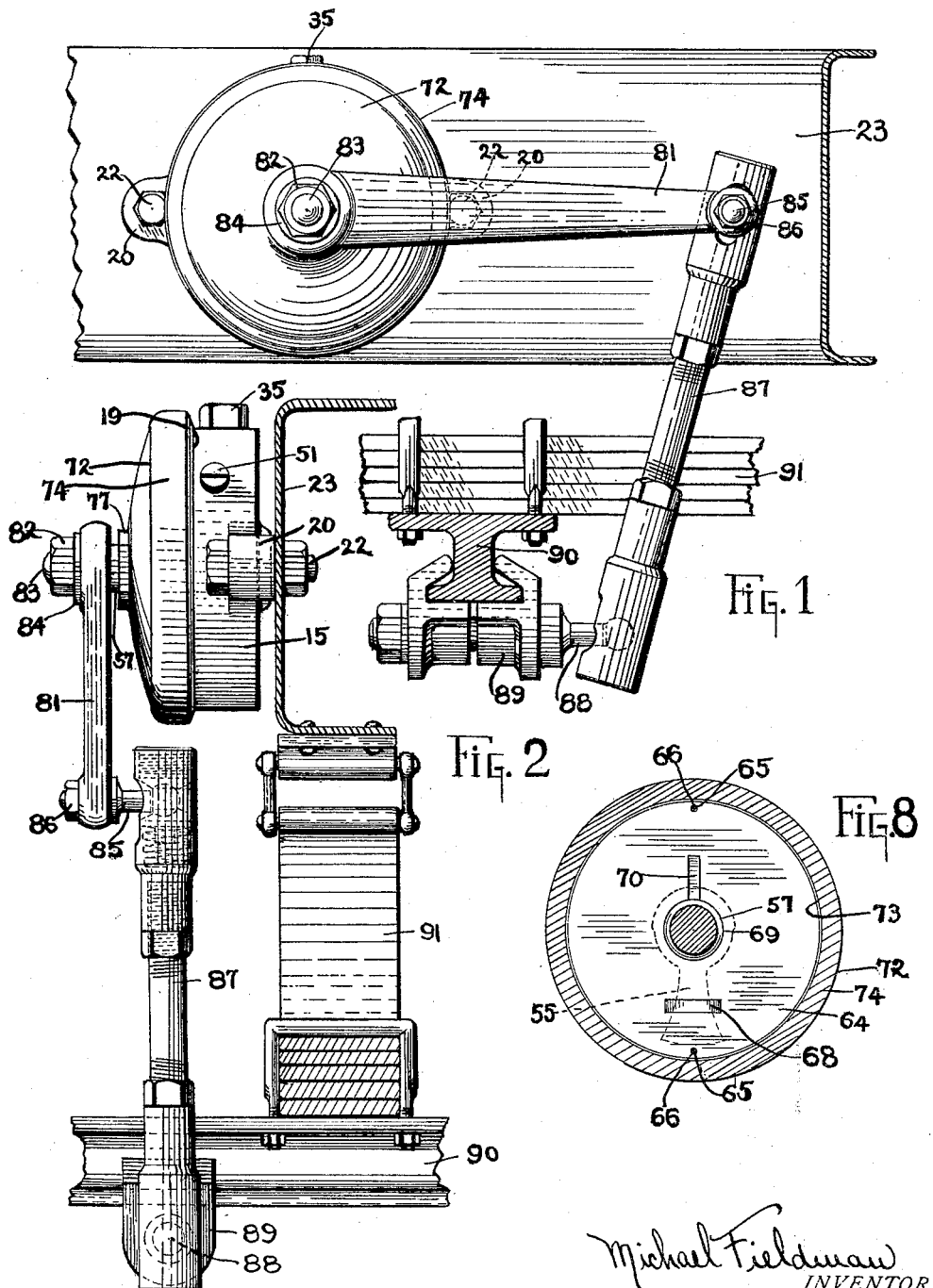

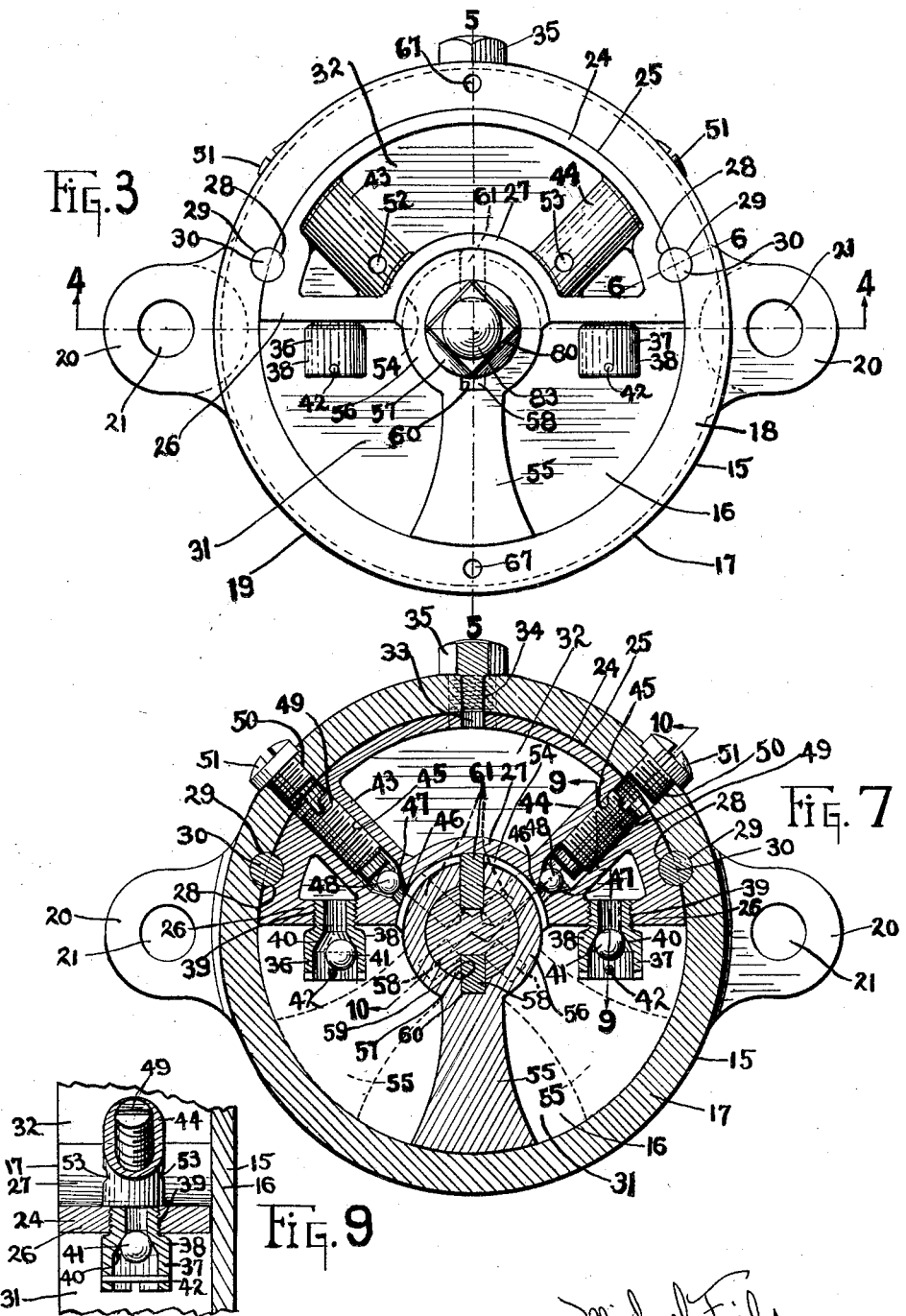

Patented Nov. 29, 1932

1,889,354

UNITED STATES PATENT OFFICE

MICHAEL FIELDMAN, OF PHILADELPHIA, PENNSYLVANIA

SHOCK ABSORBER

Application filed June 23, 1927, Serial No. 200,812. Renewed May 14, 1931.

My invention relates to new and useful improvements in double acting hydraulic shock absorbers such as are used to control the flexing of springs of motor or other vehicles, where a confined liquid is depended upon to govern the flexing of the springs which would otherwise result in discomfort to the occupants of the vehicle.

One of the objects of my invention is to provide a device of the class mentioned that will offer a definite adjustable resistance to what may be termed "rebound" movement and the "compressive" movement of the vehicle springs which result in the vehicle body being thrown sharply upward in the first instance, and then causes the body to be moved toward the axles in the second instance, sometimes even striking said axles.

Another object of my invention is to produce a shock absorber wherein fixed escapement of liquid during a short oscillation will permit the springs of the vehicle to have "free play" for a limited distance above and below the normal rest positions of said springs.

A further object of my invention is to produce a device of this character wherein the adjustments for "rebound" and "compressive" action are independent of each other, neither being permanently fixed to prevent adjustment by the user.

A still further object of my invention is to provide a shock absorber that may be manufactured cheaply and will be applicable for installation on either side of the vehicle without change in construction and necessitating only certain adjustments to adapt it to the direction of the resistances.

Other objects of my invention will be more fully described below and illustrated in the accompanying drawings and then specifically pointed out in the claims.

In order that those skilled in the art to which this invention appertains may understand how to make and use the same, I will describe a preferred form in detail, referring by numerals to the accompanying drawings forming a part of this application in which:

Fig. 1 is a full front elevation of the entire shock absorber as it would appear installed on the frame and axle of a motor vehicle looking toward the side of the vehicle.

Fig. 2 is a side elevation of Fig. 1 looking toward the right side of Fig. 1 with certain parts depressed.

Fig. 3 is an enlarged front elevation of the body of the device with its covers and the connecting lever removed.

Fig. 4 is a horizontal cross section of the complete device on the line 4—4 of Fig. 3.

Fig. 5 is a vertical cross-sectional view on the line 5—5 of Fig. 3.

Fig. 6 is a fragmentary sectional view on the line 6—6 of Fig. 3.

Fig. 7 is a vertical sectional view on the line 7—7 of Fig. 5.

Fig. 8 is a sectional view, on a reduced scale, on the line 8—8 of Fig. 5.

Fig. 9 is a fragmentary section on the line 9—9 of Fig. 7.

Fig. 10 is a fragmentary section on the line 10—10 of Fig. 7, somewhat similar to that shown in Fig. 5 except in a different position.

In carrying out my invention, as herein embodied, 15 represents the body of the device preferably cylindrical in shape and including an end wall 16, a circular side wall 17, the latter providing a smooth facing edge 18 and being externally threaded as at 19. Lugs 20 may be formed with the body and provided with holes 21 for the passage of suitable fastening devices 22, Figs. 1 and 2, for securing the device to the vehicle frame, a portion of which is designated by the numerals 23.

The interior of the body 15 being hollow forms a chamber which is spaced both for a working compartment and a reserve compartment as will be presently described. Within the body chamber is mounted a semi-circular frame 24 including a convex wall 25 which very closely fits the side wall of the body and a straight wall 26 having a central concave formation 27 intermediate the ends. The ends of the convex wall 25 where they join with the straight wall 25 are thickened to a desirable degree in order to strengthen the frame 24 and permit the formation of notches 28 which align with notches 29 in the side wall of the body, and for the reception of dowels 30 to hold the frame 24 in place.

The frame 24 effectively divides the interior of the body into two compartments 31 and 32 which are noncommunicable except as hereinafter described and the chamber 33 in the convex wall of the frame and another hole 34 in the side wall of the body, the said holes aligning with each other and being normally closed by a threaded plug 35.

The liquid in the chamber 32 is released therefrom through check valves 36 and 37, the bodies 38 of which may be likened to a filster headed screw for threaded insertion in holes 39 in the straight wall 26 of the frame. The body of each check valve has a bore therethrough of two different diameters with an intermediate tapered portion providing a seat 40 for the ball 41 which is held within the body by a retaining pin 42. Through the medium of said check valves the compartments 31 and 32 are in communication at two different points.

Radial pillars 43, 44 are also formed with the frame 24 and each is provided with a threaded bore 45 running from the convex surface of the wall 25 to the concave surface of the wall 27 and the inner of the bore is of smaller diameter than the major portion thereof so as to form an inlet 46 with a conical valve seat 47 between the two different diameters of the bore. A ball valve 48 coacts with the seat 47 and is limited in its movements by an adjusting screw 49, threaded in the large portion of the bore 45. The bore 45 of each pillar is in endwise alignment with a hole 50 formed in the side wall 17 of the body and normally closed by a sealing screw 51.

It might be well to state at this time that the frame 24 in the course of production is conveniently cast as a continuous ring or in other words, two of the frames are cast integral, and after some of the work thereon has been completed, the casting is divided as by sawing it in two. The parts thus formed provide frames for two separate shock absorbers.

Ports 52 and 53 provide communications between the bores of the pillars 43 and 44 respectively with the compartment 32 and the inlets to the bores of said pillars terminating at the concave surface of the wall 27 form communications between the bore of said pillars and the inlet groove 54 formed in the smaller radius portion of the piston body 55, said smaller radius portion of the piston body being the exterior surface of the piston hub 56, which rotates within the concave formation 27. It is to be particularly noted that said smaller radius portion of the piston body is slightly less than one-half of the circumference of the hub and ends abruptly just short of the horizontal diameter when considered with the piston in its rest position. The piston 55 is of wing-like formation and provided with two radial diameters, the small one being the exterior surface of the piston hub as before stated, while the larger radius is equal to the radius of the body, so as to bear closely against the inner circumference of the side wall 17, said piston being fixed upon the shaft 57 by means of a key 58 and keyways 59 and 60 in said shaft and piston respectively. The piston is further held on the shaft by a pin 61 which is of greater diameter than the width of the groove 54, and passes through said groove so as to divide the same into two sections both leading to the compartment 31, one on one side of the piston and the other on the other side thereof.

From the foregoing it will be obvious that one section of the groove 54 completes the line of communication between the compartment 31 at one side of the piston 55, and the compartment 32 through the valve mechanism in the pillar 43 and through the port 52 in said pillar, while the other section of the groove 53 completes the line of communication between the compartment 31 on the opposite side of the piston 55, through the valve controlled bore in the pillar 44 and the port 53.

By the several lines of communication between the compartments 31 and 32, a continuous means of inlet and outlet is provided to and from both sides of the piston, both being exactly alike in construction and functioning, although independent of each other, as regards variations of adjustment.

The ends of the shaft 57 project beyond the ends of edges of the piston and the inner end of said shaft is journalled in a bearing 62 formed with or in the wall 16 of the body. The other end of said piston being journalled in an external hub 63 carried by and preferably formed with the cover 64, the inner face of which is smooth and is disposed against the smooth facing edge 18 of the body where it is properly positioned by means of dowels 65, passing through holes 66 in said cover into holes 67 in the side wall 17 of the body. With this cover in place, a closed cylinder is provided, against the walls of which the piston works very closely.

In the inner face of the cover is formed a horizontal depression 68, Figs. 5 and 8, which is located at about the center of the compartment 31, both horizontal and perpendicular, although it might be nearer or farther away from the center of the device as a whole if found desirable.

Said depression 68 is slightly longer than the width of the piston and permits the liquid in the compartment 31 to flow freely back and forth from one side of the piston to the other while said piston is in its normal rest position or during such time as it may take for the piston to move from the rest position to either end of the depression. In the inner face of the cover 64 about the bearing or hole through the hub for the shaft, is a slight chamfer 69 communicating with a radial channel 70 of such length as to form a communication between the annular duct formed by the chamfer, and the compartment 32. This arrangement provides for the relief of pressure at the outer shaft bearing so that should any leakage tend to occur about said outer bearing of the shaft, the liquid will pass about the duct and then through the channel 70 into the compartment 32.

The outer end of the hub 63 is recessed to provide one half of a stuffing box which is packed with a suitable packing material such as hydraulic stuffing material 71.

The open end of the body is closed by a cap 72 mounted on the side wall of the body by means of threads 73 which engage the threads 19, said threads 73 being formed in the flange 74. This cap is provided with an inwardly projecting hub 75 internally threaded for the reception of the stuffing box screw 76, the latter being provided with a boss 77 of suitable construction for the reception of a tool to screw said stuffing box into place which will compress the stuffing material and prevent escape of liquid from the compartment 31.

On the outer face of the cover 64, is formed a slight shoulder 78 which coacts with a shoulder 79 on the inner surface of the cap 72, so that when said cap is screwed home said shoulder 79 assists in supporting the cover 64 as well as forcing said cover firmly against the edge of the body side wall 17.

A portion of the outer end of the shaft 57, which projects beyond the stuffing box screw is squared as at 80 to receive the lever 81, the latter being held in place by a nut 82 screwed on to the threaded reduced terminal 83 of the shaft 57 and if found desirable a washer 84 may be interposed between the nut and the lever.

A ball pin 85 has its shank projected through the outer end of the lever 81 where it is held in place by a nut 86 and connected by the usual ball and socket joint construction with one end of the drag link 87, the other end of said drag link being connected by a ball bolt 88 carried by the shackle 89 made fast to the vehicle axle 90 between the axle and the frame of the vehicle is interposed a spring 91.

As before stated, the device is installed by mounting the body on some suitable part of the vehicle frame and then connecting one end of the drag link to the free end of the lever 81 and the opposite end of said drag link to an axle or other movable part of the vehicle connected with a spring. At the time of installation, with the vehicle at rest and in a level condition, the lever 81 should be in a horizontal position as shown in Fig. 1, it being understood that when in a position such as shown in Fig. 2, an action has taken place which extended the spring thus carrying the lever to an angular position. When the lever is in the position shown in Fig. 1, the piston is in the position shown in Figs. 3, 7 and 8 and therefore said piston is lying centrally of the depression 68 with the ends of the latter projecting beyond the sides of said piston so as to be in a communication with both parts of the compartment 31 at opposite sides of the piston.

The apparatus being installed as above described, should any movement take place between the vehicle body and axle, such movement or movements will be permitted to take place freely and to the extent that the piston 55 moves within the limits of the depression 68, such freedom of movement being allowed by the passage of liquid from one side of the piston to the other through the depression 68.

Immediately the lever 81 is moved up or down, the piston 55 will be moved counter clockwise or clockwise beyond either end of the depression 68, then the passage of liquid through said depression is stopped, and pressure begins to accumulate at one side or the other of said piston.

As an example, when the lever 81 is moved upward a distance that will carry the piston 55 in a counter clockwise direction a sufficient distance to shut off passage of liquid through the depression 68, then pressure begins to accumulate in the right hand side of compartment 31 when considered in connection with Fig. 7. This will close the check valve 37, thus shutting off the escape of liquid directly into the compartment 32, but a gradual escape of the liquid from compartment 31 at the right hand side of the piston will be permitted through that portion of the groove 54 leading to the valve controlled passageways through the pillar 44, and these passageways may be regulated by the adjusting screw 45 in said pillar 44, and thence to the compartment 32 through the port 53.

While the above described action is taking place, the liquid in the compartment 32 is allowed to flow freely into that portion of the compartment 31 at the left hand side of the piston because the ball of the check valve 36 will have been unseated and the passageways through the check valves are of greater capacity than either of the ports 52 or 53 so that the flow of liquid from the compartment 32 is practically unrestricted.

When a condition arises that causes the piston 55 to rotate clockwise, a similar action takes place but the liquid flows through companion passageways and valve mechanism.

It will be understood that different adjustments may be had in the passageways from the compartment 31 to the compartment 32, and therefore, the resistance offered for the compressive action may be greater than that offered for the rebound action or vice versa and any degree of resistance for either compressive or rebound actions may be obtained through the medium of the adjusting screws 49.

Of course I do not wish to be limited to the exact detail of construction herein shown and described as these may be varied within the limits of the appended claims without departing from the spirit of my invention.

Having thus fully described my invention, what I claim as new and useful is:

1. A shock absorber comprising a closed cylindrical body, a valve housing within the body dividing the interior thereof into two compartments, two sets of check valve controlled inlets and outlets forming communications between said compartments at separated points, a piston within one of the compartments, said inlets and outlets permitting a flow of fluid within the body from one compartment to the other at opposite sides of the piston, and means providing for a limited flow of fluid from one side of the piston to the other within its compartment.

2. In a shock absorber, a semi-circular frame provided with two pillars, each of said pillars having a bore therethrough to form valve housings.

3. In a shock absorber, a semi-circular frame, a hub, a cross piece connecting the ends of the frame and the hub and two pillars, said pillars being hollow to form valve housings.

4. The structure set forth in claim 3 wherein the cross piece is provided with an intermediate concave formation and a hole at each side of the concavity.

5. A shock absorber including a body adapted to contain a fluid, means to divide the interior of the body into two compartments, a cover for the body, a shaft journalled in a wall of the body and said cover, a piston snugly fitting within the body and mounted on the shaft for rotation within one of the compartments, said piston having a short radius portion and a long radius portion, said long radius portion of the piston body engaging the side wall of the body and the short radius portion of the piston body engaging a portion of the means which divides the interior of the body, said short radius portion of the piston body being slightly less than one-half of the circumference of that portion, of the piston engaging the shaft and ending abruptly adjacent the horizontal diameter of the piston when the latter is at rest, said short radius portion of the piston body having a groove therein, means to separate the ends of said groove from each other and valve controlled passageways between the compartments on both sides of the piston, certain of said passageways communicating with the groove.

6. The structure set forth in claim 5 in connection with means to position the cover and a cap mounted on the body and engaging said cover to hold the latter in place.

7. A shock absorber comprising, in combination, a body and open at one end, a cover to normally close said open end, a stuffing box section formed with said cover, a cap having threaded engagement with the body and provided with an interior shoulder engaging the cover to hold the latter in place, and a stuffing box screw having threaded connection with the cap and coacting with the stuffing box section on the cover.

8. A shock absorber including a circular body, a piston journalled to rotate in said body and provided with an arcuate hub, a semi-circular frame mounted in the body and engaging the circular wall thereof, a cross piece connected with the ends of the semi-circular frame and acting as a partition to divide the interior of the body into two compartments, a concave formation intermediate the ends of the cross piece and partially surrounding the piston hub, pillars formed integral with the semi-circular frame and cross piece and having bores therethrough, the outer ends of which communicate with openings in the body, and said pillars further provided with transverse openings leading from the bores, valve members in the pillar bores, said cross piece having openings therethrough, and check valves mounted in said openings.

9. A shock absorber including a hollow body adapted to contain a fluid and having its interior divided into two compartments, a combined cover and stuffing box section on the body, a shaft journalled in the end wall of the body and said cover and passing through the stuffing box section, said cover having a chamfer surrounding the shaft and a depression radiating from the chamfer to provide communication between the latter and one of the compartments, a piston mounted on the shaft for rotation within one of the compartments, and means connected with the body for completing the stuffing box.

10. A shock absorber including a hollow body adapted to contain a fluid and having its interior divided into two inter-communicating compartments, a shaft journalled within said body, and a piston mounted on the shaft for rotation within one of the compartments, said piston having a short radius and a long radius, the short radius portion of the piston body terminating a short distance above the horizontal median line of the shock absorber body.

11. A shock absorber including a body adapted to contain a fluid and having its interior divided into two compartments, a shaft journalled centrally of said body, a piston on said shaft having long and short radii, the short radius portion of which terminates just above the horizontal diameter of the shock absorber body.

12. A shock absorber comprising a body including end walls, means to divide the interior into working and storage compartments, a shaft journaled in the end walls, a piston on said shaft, one of said end walls having a channel in its inner face surrounding the shaft and in constant direct communication with both of said compartments.

13. A hydraulic shock absorber comprising a body including end walls, a partition element in said body, a shaft projecting through one of the end walls, a piston on the shaft within the body and combining with the partition element to subdivide the interior of the body into two working compartments, a reserve chamber for supplying liquid to said compartments and a channel surrounding the shaft at the inner face of the end wall through which the shaft projects and communicating directly with said compartments.

In testimony whereof, I have hereto affixed my signature.

MICHAEL FIELDMAN.